US011907738B2

(12) United States Patent
Lin et al.

(10) Patent No.: US 11,907,738 B2
(45) Date of Patent: Feb. 20, 2024

(54) IMAGE PROCESSING METHOD AND DISPLAY DEVICE

(71) Applicant: Realtek Semiconductor Corporation, Hsinchu (TW)

(72) Inventors: Yuh-Wey Lin, Hsinchu (TW); Chun-Hao Huang, Hsinchu (TW)

(73) Assignee: Realtek Semiconductor Corporation, Hsinchu (TW)

(*) Notice: Subject to any disclaimer, the term of this patent is extended or adjusted under 35 U.S.C. 154(b) by 310 days.

(21) Appl. No.: 17/645,317

(22) Filed: Dec. 21, 2021

(65) Prior Publication Data

US 2023/0011676 A1    Jan. 12, 2023

(30) Foreign Application Priority Data

Jul. 12, 2021   (TW) .................................. 110125467

(51) Int. Cl.
 *G06F 9/451* (2018.01)
 *G06F 3/14* (2006.01)
 (Continued)

(52) U.S. Cl.
 CPC ............ *G06F 9/451* (2018.02); *G06F 3/0481* (2013.01); *G06F 3/0484* (2013.01);
 (Continued)

(58) Field of Classification Search
 CPC ...... G06F 9/451; G06F 3/1423; G06F 3/0481; G06F 3/0484; G06F 3/04842; G06F 3/04886; G06F 3/1431; G06F 3/1446; G06F 3/1454; G06F 3/147; G06F 3/14; G09G 5/12; G09G 5/14; G09G 2300/026; G09G 2310/0232; G09G 2340/04; G09G 2370/042; G09G 2370/20; G09G 2370/22
 See application file for complete search history.

(56) References Cited

U.S. PATENT DOCUMENTS 10,607,571 B2 * 3/2020 Utsch ................. G09G 5/12
11,262,968 B2 * 3/2022 Tian .................... G06F 3/1454
(Continued)

FOREIGN PATENT DOCUMENTS

CN       105450908 A     3/2016
CN       110709813 A     1/2020
(Continued)

*Primary Examiner* — Vijay Shankar
(74) *Attorney, Agent, or Firm* — CKC & Partners Co., LLC (57) ABSTRACT

An image processing method applied to a display device having a processing circuit and a screen and includes: receiving a first image from one of a plurality of electronic devices; detecting whether the first image has a black border area; and if the first image has the black border area, performing a first display operation, wherein performing the first display operation includes: removing the black border area of the first image, to generate a second image; adjusting the size of the second image according to the size of a display area of the screen; calculating a first blank area of the screen based on the adjusted second image; requesting a third image from another one of the electronic devices according to the size of the first blank area; and filling the display area of the screen with the adjusted second image and the third image.

20 Claims, 6 Drawing Sheets

(51) Int. Cl.
*G06F 3/048* (2013.01)
*G06F 3/0481* (2022.01)
*G06F 3/04842* (2022.01)
*G06F 3/0484* (2022.01)

(52) U.S. Cl.
CPC ........ *G06F 3/04842* (2013.01); *G06F 3/1423* (2013.01); *G06F 3/1431* (2013.01)

(56) References Cited

U.S. PATENT DOCUMENTS

| | | | |
|---|---|---|---|
| 11,360,732 B1* | 6/2022 | Dagani | G09G 5/14 |
| 11,474,658 B2* | 10/2022 | Chiang | G09G 5/14 |
| 11,687,311 B2* | 6/2023 | Liu | G06F 3/1454 |
| | | | 345/1.1 |
| 2019/0051268 A1* | 2/2019 | Utsch | G06F 3/1446 |
| 2022/0147195 A1* | 5/2022 | Chiang | G06F 3/0481 |

FOREIGN PATENT DOCUMENTS

| | | |
|---|---|---|
| CN | 111800574 A | 10/2020 |
| CN | 112995535 A | 6/2021 |

\* cited by examiner

IMAGE PROCESSING METHOD AND DISPLAY DEVICE

CROSS-REFERENCE TO RELATED APPLICATION

This application claims priority to Taiwan Application Serial Number 110125467, filed Jul. 12, 2021, which is herein incorporated by reference in its entirety.

BACKGROUND

Field of Invention

This disclosure relates to a display device and image processing method, and in particular to a display device capable of displaying a number of images from a number of electronic devices simultaneously and image processing method.

Description of Related Art

When displaying images from different devices simultaneously, conventional display device may easily meet following problems:
1. If the user wants to adjust proportion of image, it is required to manually set in a OSD (on screen display) manner; and
2. If the display devise is coordinated with mobile devices (e.g., smart phone, tablet, etc.), the display screen would have black borders, which results in low screen usage rate and unclear image content.

SUMMARY

An aspect of present disclosure relates to an image processing method. The image processing method is applied to a display device having a processing circuit and a screen and includes: by the processing circuit, receiving a first image from one of a plurality of electronic devices; by the processing circuit, detecting whether the first image has a black border area; and if the first image has the black border area, by the processing circuit, performing a first display operation, wherein performing the first display operation includes: removing the black border area of the first image, to generate a second image; adjusting the size of the second image according to the size of a display area of the screen; calculating a first blank area of the screen based on the adjusted second image; requesting a third image from another one of the electronic devices according to the size of the first blank area; and filling the display area of the screen with the adjusted second image and the third image.

Another aspect of present disclosure relates to a display device. The display device includes a screen and a processing circuit. The screen has a display area. The processing circuit is coupled to the screen and is configured to perform operations of: receiving a first image from one of a plurality of electronic devices; detecting whether the first image has a black border area; and if the first image has the black border area, performing a first display operation, wherein performing the first display operation includes: removing the black border area of the first image, to generate a second image; adjusting the size of the second image according to the size of a display area of the screen; calculating a first blank area of the screen based on the adjusted second image; requesting a third image from another one of the electronic devices according to the size of the first blank area; and filling the display area of the screen with the adjusted second image and the third image.

DETAILED DESCRIPTION

The embodiments are described in detail below with reference to the appended drawings to better understand the aspects of the present disclosure. However, the provided embodiments are not intended to limit the scope of the disclosure, and the description of the structural operation is not intended to limit the order in which they are performed. Any device that has been recombined by components and produces an equivalent function is within the scope covered by the disclosure.

The terms used in the entire specification and the scope of the patent application, unless otherwise specified, generally have the ordinary meaning of each term used in the field, the content disclosed herein, and the particular content.

The terms "coupled" or "connected" as used herein may mean that two or more elements are directly in physical or electrical contact, or are indirectly in physical or electrical contact with each other. It can also mean that two or more elements interact with each other.

Figure 1:
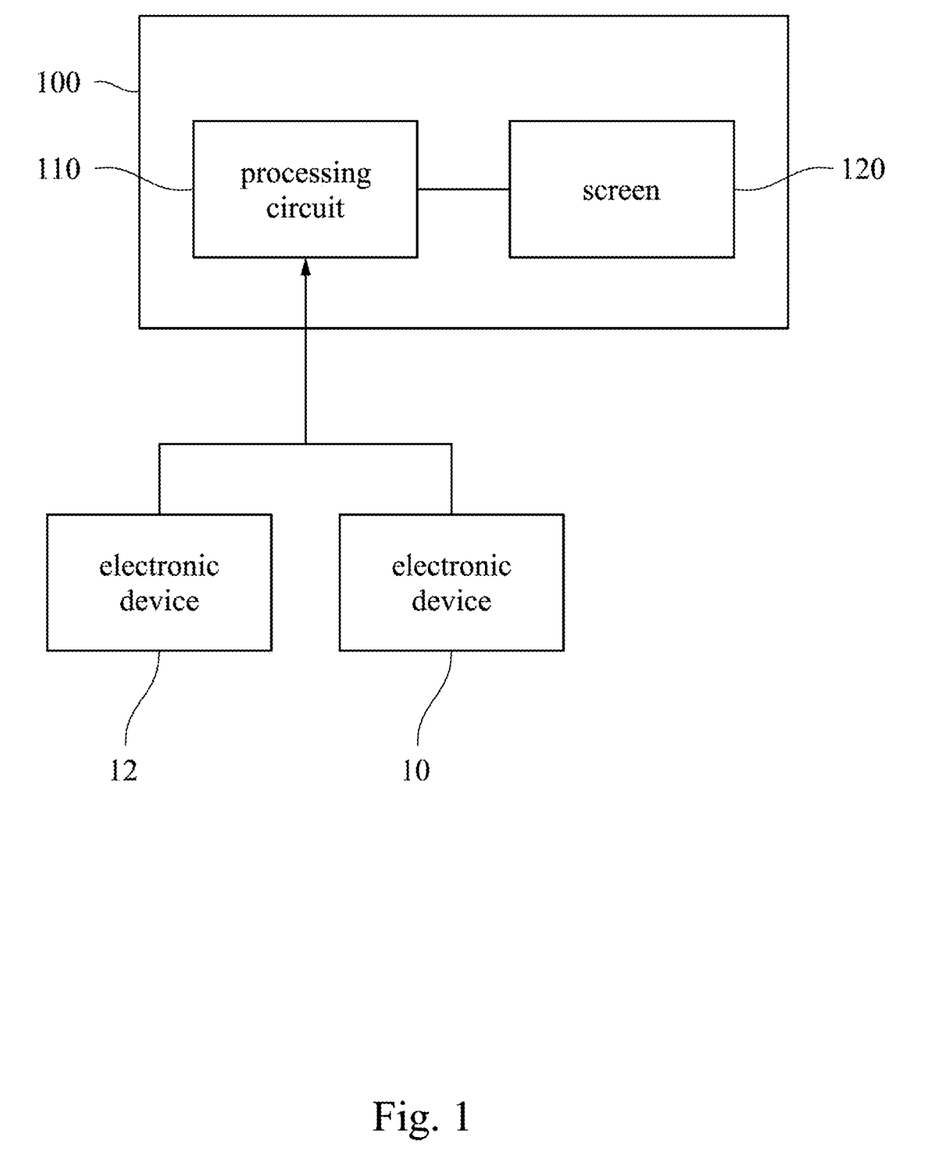
FIG. 1 is a block diagram of a display device in accordance with some embodiments of the present disclosure.

Referring to FIG. 1, FIG. 1 is a block diagram of a display device 100 in accordance with some embodiments of the present disclosure. The display device 100 includes a processing circuit 110 and a screen 120. In some embodiments, the display device 100 can be, for example but not limited to, a liquid crystal display (LCD) or an organic light emitting diode (OLED) display.

In structure, the processing circuit 100 is coupled to the screen 120. In particular, the processing circuit 110 is configured to receive and process a plurality of images from a plurality of electronic devices. For simplification and convenience of the description, FIG. 1 shows the electronic device 10 and electronic device 12 only, but the present disclosure is not limited herein. After being processed by the processing circuit 110, the images are displayed on the screen 120 simultaneously for the user to view. In the present embodiment, the processing circuit 110 can be implemented by a scaler, but the present disclosure is not limited herein. In the present embodiment, the electronic device 10 can be, for example but not limited to, a smart phone, and the electronic device 12 can be, for example but not limited to, a desk computer or a laptop. In other embodiments, the electronic device 10 is a mobile device, such as tablet, wearable equipment, etc.

Figure 2:
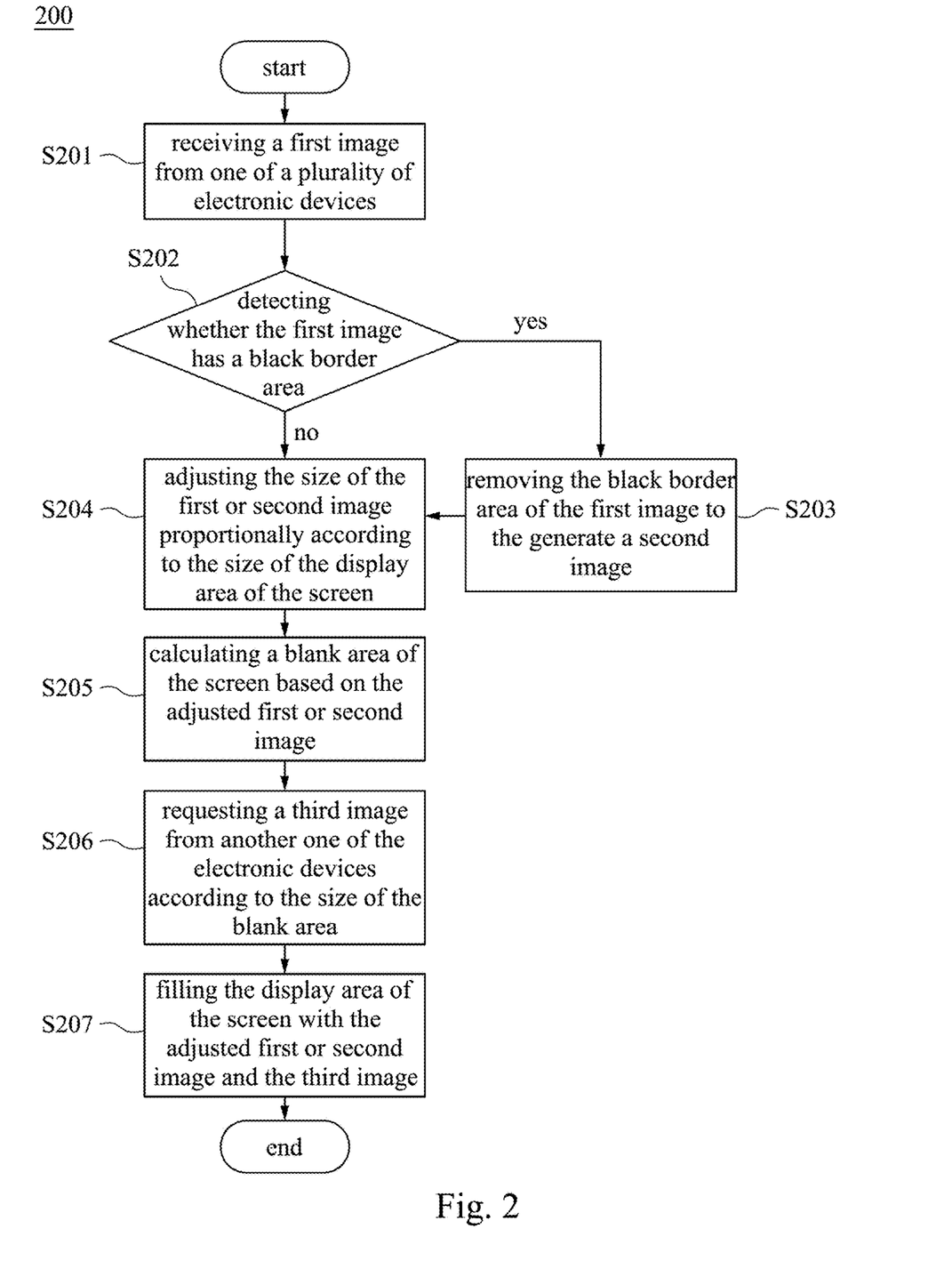
FIG. 2 is a flow diagram of an image processing method in accordance with some embodiments of the present disclosure.

Referring to FIG. 2, FIG. 2 depicts an image processing method 200 in accordance with some embodiments of the present disclosure. The image processing method 200 can be executed by the processing circuit 110 of the display device 100 of FIG. 1, so that different images from different electronic devices can be displayed on the screen 120 simultaneously. In some embodiments, the image processing method 200 includes operations S201-S207. For convenience of description, the image processing method 200 would be described below with reference to FIGS. 1 and 3-6.

Figure 3:
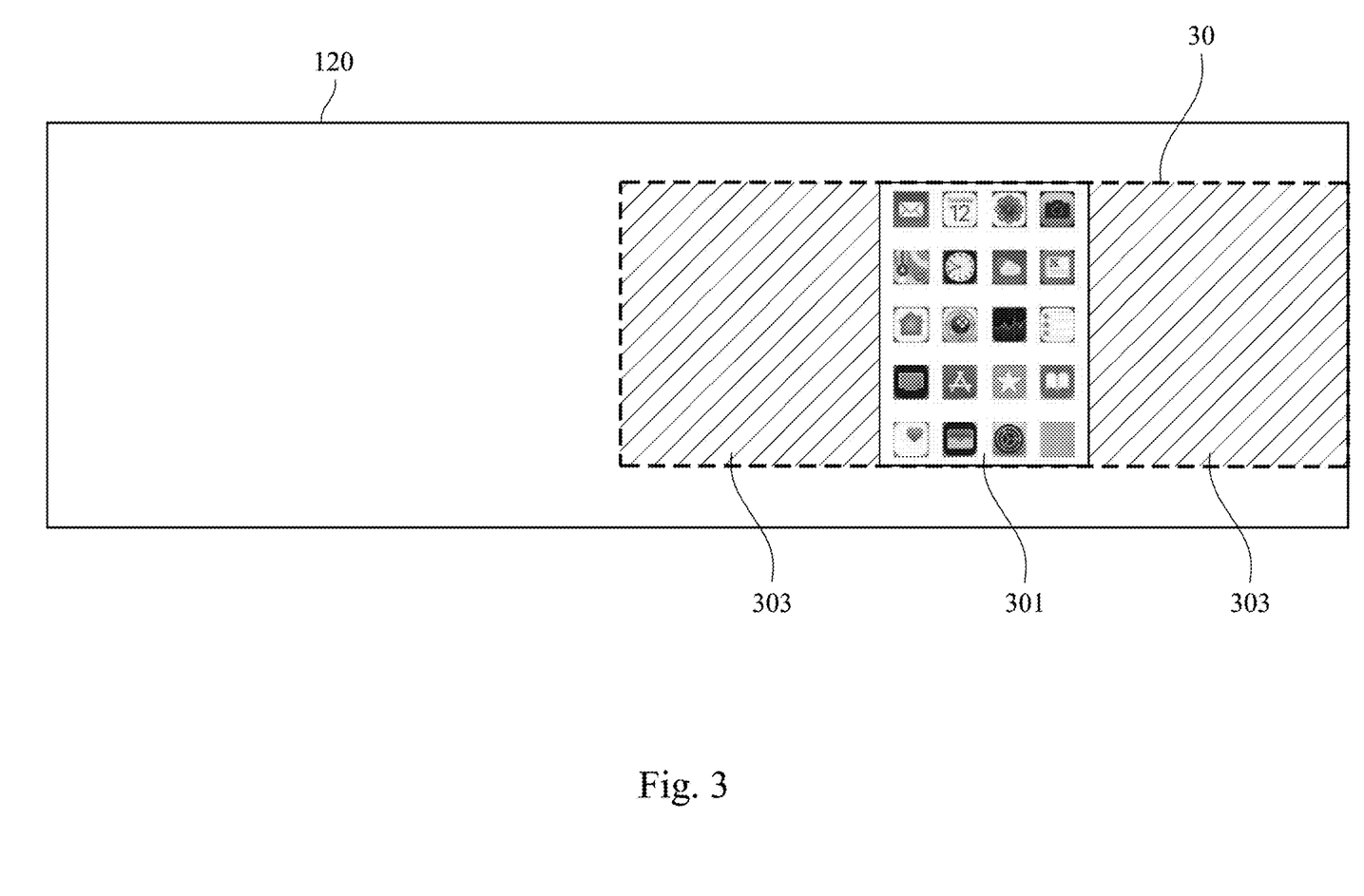
FIGS. 3-6 are schematic diagrams of execution process of the image processing method in accordance with some embodiments of the present disclosure.

In operation S201, the processing circuit 110 receives a first image 30 from the electronic device 10 (i.e., one of the electronic devices). Referring to FIG. 3 together, FIG. 3 is a schematic diagram of a comparison of a display area (i.e., the area surrounded by solid lines) of the screen 120 with the first image 30 (i.e., the area surrounded by broken lines). At this time, the first image 30 is not displayed in the display area of the screen 120. FIG. 3 shows that the first image 30 is in the display area of the screen 120, which is only for convenience of description of a difference of resolution and a size relationship between the first image 30 and the display area of the screen 120. It can be appreciated that the electronic device 10 usually displays image in a vertical direction (because the electronic device 10 has a narrow screen). However, for coordinating with the screen 120 which displays image in a horizontal direction (that is, the screen 120 has a wide screen), the first image 30 inputted into the display device 100 would have a format suitable for displaying in a horizontal direction. In particular, if the screen of the electronic device 10 displays an images with 750*1334 pixels (equivalent to an image with an aspect ratio of 9:16), the first image 30 received by the display device 100 would substantially be 1334*750 pixels (equivalent to an image with an aspect ratio of 16:9). In the embodiment of FIG. 3, the first image 30 includes an image area 301 and two black border areas 303 (i.e., areas filled with oblique lines). The image area 301 is actually the image displayed on the screen of the electronic device 10, and data values of all pixels thereof are not all corresponding to the lowest gray scale (e.g., 0). In addition, the black border areas 303 are non-image areas (or areas without data) that the electronic device 10 uses to merge with the image area 301 to generate the first image 30, and data values of all pixels thereof are all corresponding to the lowest gray scale.

In operation S202, the processing circuit 110 detects whether the first image 30 has a black border area. For detecting whether the first image 30 has the black border area, the processing circuit 110 scans all pixels of the first image 30 first, to obtain a plurality of data values corresponding to the pixels. In some embodiments, the display device 100 can store the received first image 30 in a memory circuit (not shown, e.g., flash memory), and the processing circuit 110 accesses the first image 30 from the memory circuit to perform operation S202. Then, the processing circuit 110 searches the image area 301 according to a distribution of the data values. In the embodiment of FIG. 3, the processing circuit 110 scans each row of pixels of the first image 30 having 1334*750 pixels in sequence, and records a distribution of data values of each row of pixels. For example, in $n^{th}$ row of pixels (n ranges from 1 to 750), the data values of $1^{st}$ to $456^{th}$ and $879^{th}$ to $1334^{th}$ of pixels are all 0, and the data values of $457^{th}$ to $878^{th}$ of pixels are not all 0. In this example, if the data values of $1^{st}$ to $456^{th}$ and $879^{th}$ to $1334^{th}$ of pixels in other rows of pixels are all 0, the processing circuit 110 sets $1^{st}$ row of pixels, $750^{th}$ row of pixels, $457^{th}$ column of pixels and $878^{th}$ column of pixels as four boundary lines, so as to find the image area 301 from the first image 30.

In other words, the horizontal boundary line of the image area 301 can be the first row or the last row of pixels, and the vertical boundary line of the image area 301 can be one row of pixels that the data values of an adjacent column of pixels are all o but the data values of its own are not all 0.

After finding the image area 301, the processing circuit 110 further compares the first image 30 and the image area 301 in size. In the embodiment of FIG. 3, the size of the image area 301 is smaller than the size of the first image 30. Therefore, the processing circuit 110 determines that the first image 30 has the black border areas 303 and performs operation S203.

Figure 4:
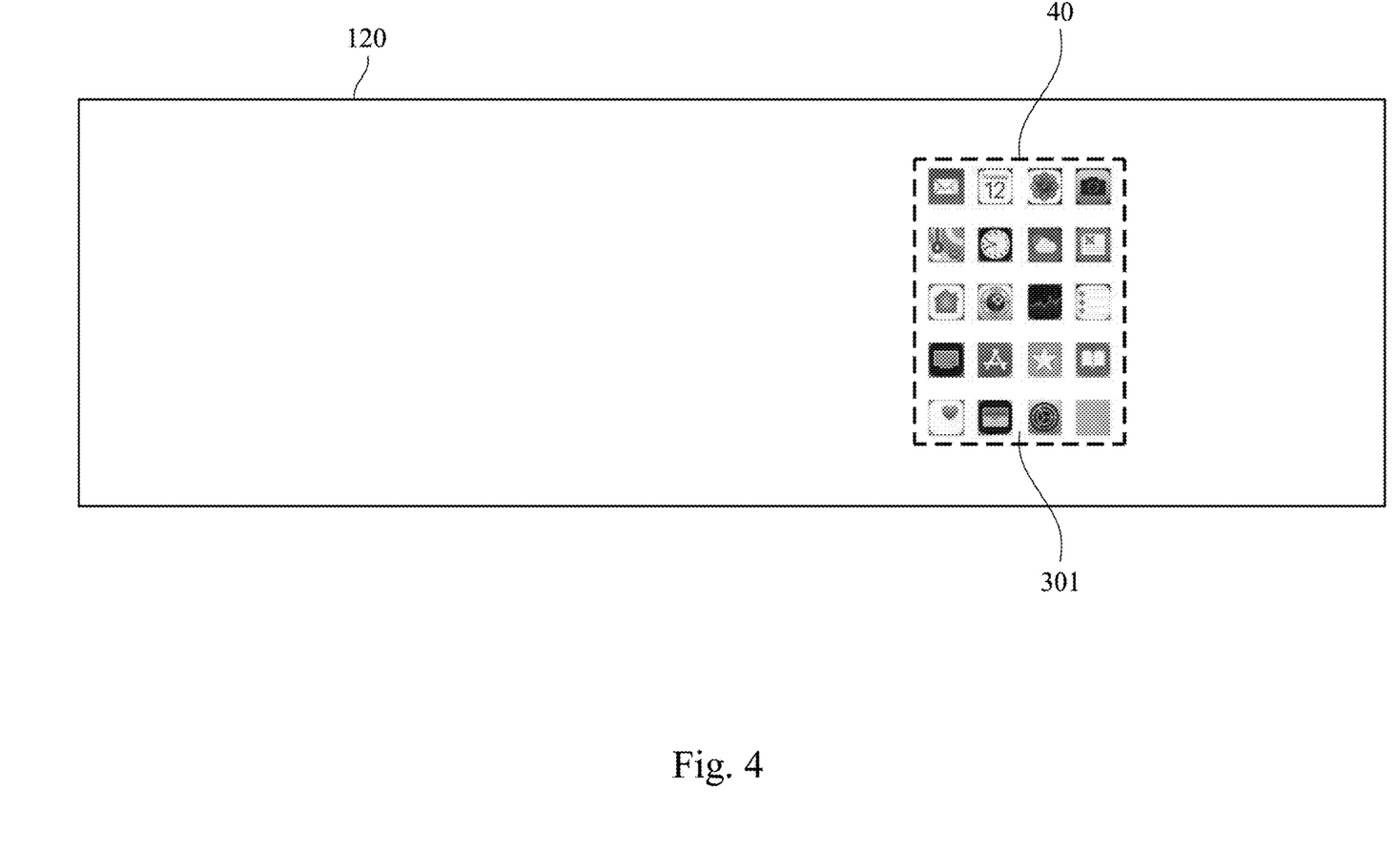

In operation S203, the processing circuit 110 removes the black border areas 303 of the first image 30 to generate the second image 40. Referring to FIG. 4 together, FIG. 4 is a schematic diagram of the display area (i.e., the area surrounded by solid lines) of the screen 120 and the second image 40 (i.e., the area surrounded by broken lines). At this time, the second image 40 is not displayed in the display area of the screen 120. FIG. 4 shows that the second image 40 is in the display area of the screen 120, which is only for convenience of description of a difference of resolution and a size relationship between the second image 40 and the display area of the screen 120. The above-described example is taken for description. During the process of removing black borders, the processing circuit 110 would cut the first image 30 having 1334*750 pixels without breaking the image area 301, to form the second image 40 having 422*750 pixels. In other words, the black border areas 303 of the first image 30 would be cut, and the second image 40 includes the image area 301 only.

Figure 5:
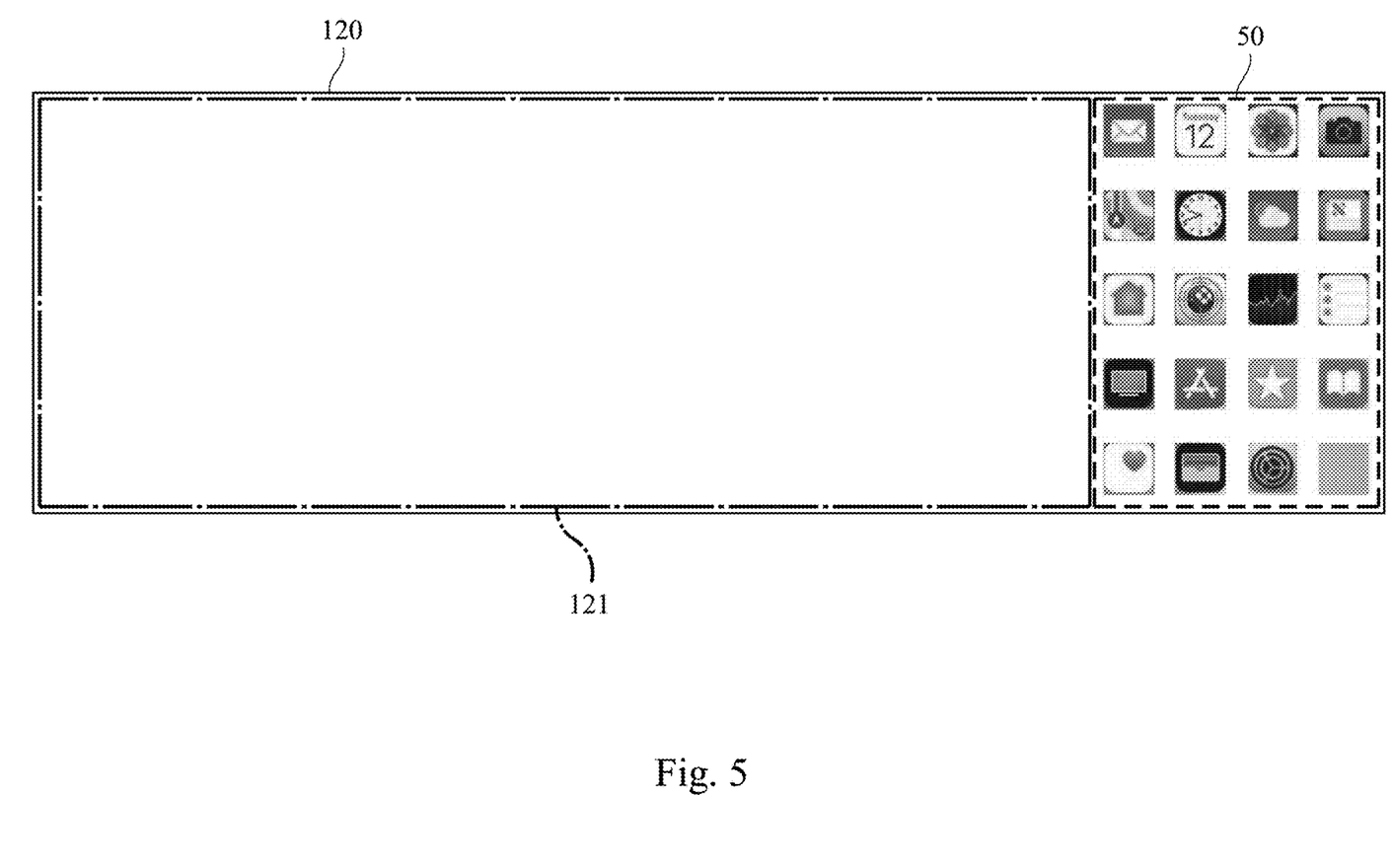

In operation S204, the processing circuit 110 adjusts the size of the second image 40 proportionally according to the size of the display area of the screen 120. Referring to FIG. 5 together, FIG. 5 is a schematic diagram of the display area (i.e., the area surrounded by solid lines) of the screen 120, a blank area 121 (i.e., the area surrounded by one-dot chain lines) and the adjusted second image (i.e., image 50). At this time, the image 50 is not displayed in the display area of the screen 120. FIG. 5 shows that the image 50 is in the display area of the screen 120, which is only for convenience of description of a difference of resolution and a size relationship between the image 50 and the display area of the screen 120. In an assumption that the vertical side length of the display area of the screen 120 is 1080 pixels, the processing circuit 110 can enlarge the second image 40 having 422*750 pixels proportionally, to form the image 50 (i.e., the area surrounded by broken lines) having 6071080 pixels. In other words, after being adjusted by the processing circuit 110, the vertical side length of the image 50 is equal to the vertical side length of the display area of the screen 120. Accordingly, as shown in FIG. 5, when the image 50 is displayed on the screen 120 in the subsequent operations, the black border would not be generated in the vertical direction.

In operation S205, the processing circuit 110 calculates the blank area 121 of the screen 120 based on the adjusted second image (i.e., the image 50). In this example, the blank area 121 represents a remaining area capable of displaying other pictures after the display area of the screen 12 displays the image 50. In an assumption that the screen 120 can display a maximal image having 3840*080 pixels, the processing circuit 110 can obtain that the size of the blank area 121 of the screen 120 is 3233*080 pixels by subtracting the image 50 having 607*080 pixels from the maximal image that the screen 120 can display.

Figure 6:
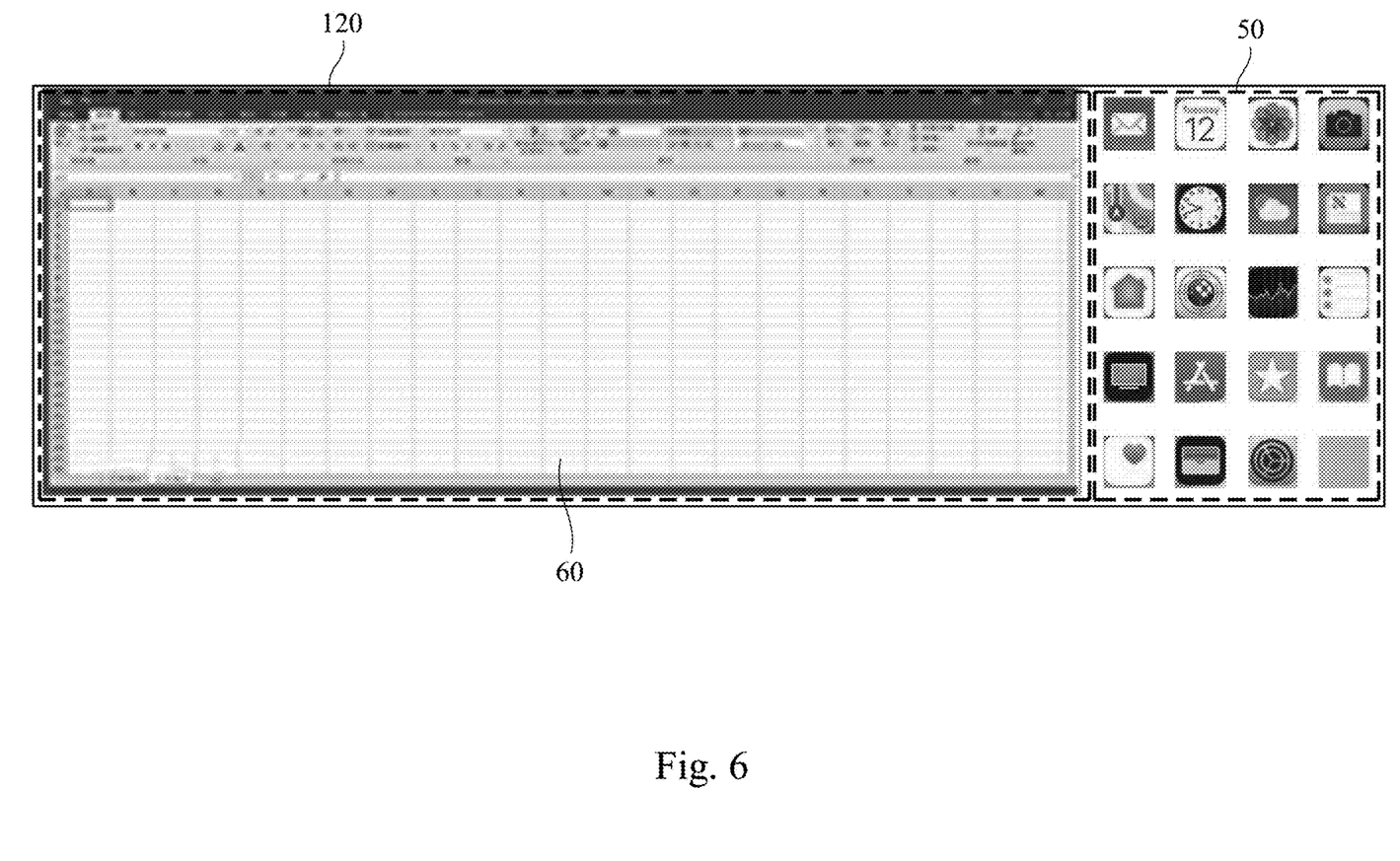

In operation S206, the processing circuit 110 requests a third image 60 from the electronic device 12 (i.e., another one of the electronic devices) according to the size of the blank area 121. Referring to FIG. 6 together, FIG. 6 is a schematic diagram of the adjusted second image (i.e., image 50) and the third image 60 which are displayed in the display area of the screen 120. In particular, the processing circuit 100 can transmit a signal to the electronic device 12 through its own or a communication device (not shown) of the display device 100. The signal can include an extended display identification data (EDID) corresponding to the size of the black area 121. Accordingly, the electronic device 12 can provides the third image 60 which has a same size as the blank area 121 and without black borders for the processing circuit 110 through the signal.

After receiving the third image 60, the processing circuit 110 can perform operation S207. In operation S207, as shown in FIG. 6, the processing circuit 110 fills the display area of the screen 120 with the adjusted second image (i.e., image 50) and the third image 60, to form a full picture without black borders on the screen 120. It can be appreciated that FIG. 6 shows that there are narrow spaces between the image 50, the third image 60 and the display area of the screen 120, but this is only for clear and convenience of description. In practical applications, there are no narrow spaces between the image 50, the third image 60 and the display area of the screen 120. That is, the image 50 and the third image 60 would form the full picture without black borders on the screen 120.

In other embodiments, operation S206 is substituted by another operation. In said another operation, the processing circuit 110 receives an image (e.g., having 19201*080 pixels) that the electronic device 12 is preset to transmit to the display device 100 from the electronic device 12. Said image has a size different to the blank area 121 (i.e., having 3233*4080 pixels). After receiving said image, the processing circuit 110 can adjust said image disproportionally, so that said image which has been adjusted has the same size as the blank area 121. Accordingly, the processing circuit 120 can perform operation S207 to fill the display area of the screen 120 with the adjusted second image (i.e., the image 50) and said image which has been adjusted. In comparison with this embodiment, the above-described embodiment which performs operation S206 may avoid the problem of picture distortion.

Referring to FIG. 2 again, in other embodiments, the user can operate the electronic device 10 (e.g., smart phone, tablet) in a manner of horizontally placing, so that the first image received by the display device 100 is an image without black borders. In such way, the image area would have the same size as the first image. Therefore, the processing circuit 110 would determine that the first image has no black border area in operation S202. Accordingly, the processing circuit 110 performs operations S204-S207 directly. In operation S204, the processing circuit 110 adjusts the size of the first image proportionally according to the size of the display area of the screen 120. In operation S205, the processing circuit 110 calculates another blank area (which has a size different from the blank area 121) of the screen 120 based on the adjusted first image. In operation S206, the processing circuit 110 requests another third image (which has a size different from the third image 60) from the electronic device 12 according to the size of said another blank area. In operation S207, the processing circuit 110 fills the display area of the screen 120 with the adjusted first image and said another third image. Other descriptions are similar to those of above-described embodiments, and therefore not repeated herein.

In sum, the display device 100 of the present disclosure processes the image with black borders by the image processing method 200, to remove black borders and adjust the size of the image proportionally. In addition, the display device 100 further calculates the blank area of the screen 120 by the image processing method 200, to request the image which has the same size as the blank area and without black borders from the specific electronic device. In such way, when being connected to the mobile device (e.g., smart phone, tablet or wearable equipment) and other different devices (e.g., desk computer), the display device 100 can achieve an effect of displaying full picture without black borders on the screen 120, increase the screen usage rate of the screen 120 and avoid the problem of picture distortion.

Although the present disclosure has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present disclosure without departing from the scope or spirit of the invention. In view of the foregoing, it is intended that the present invention cover modifications and variations of this invention provided they fall within the scope of the following claims.

What is claimed is:

1. An image processing method applied to a display device having a processing circuit and a screen, comprising:
   by the processing circuit, receiving a first image from one of a plurality of electronic devices;
   by the processing circuit, detecting whether the first image has a black border area; and
   if the first image has the black border area, by the processing circuit, performing a first display operation, wherein performing the first display operation comprises:
   removing the black border area of the first image, to generate a second image;
   adjusting the size of the second image according to the size of a display area of the screen;
   calculating a first blank area of the screen based on the adjusted second image;
   requesting a third image from another one of the electronic devices according to the size of the first blank area; and
   filling the display area of the screen with the adjusted second image and the third image.

2. The image processing method of claim 1, wherein the third image has no black borders and has the same size as the first blank area.

3. The image processing method of claim 1, wherein the processing circuit adjusts the size of the second image proportionally.

4. The image processing method of claim 1, further comprising:
   if the first image does not have the black border area, by the processing circuit, performing a second display operation, wherein performing the second display operation comprises:
   adjusting the size of the first image according to the size of the display area;
   calculating a second blank area of the screen based on the adjusted first image;
   requesting a fourth image from the another one of the electronic devices according to the size of the second blank area; and
   filling the display area of the screen with the adjusted first image and the fourth image.

5. The image processing method of claim 4, wherein the fourth image has no black borders and has the same size as the second blank area.

6. The image processing method of claim 4, wherein the processing circuit adjusts the size of the first image proportionally.

7. The image processing method of claim 1, wherein detecting whether the first image has the black border area comprises:
by the processing circuit, scanning a plurality of pixels of the first image, to obtain a plurality of data values corresponding to the pixels;
by the processing circuit, searching an image area according to a distribution of the data values; and
if the image area is different from the first image in size, by the processing circuit, determining that the first image has the black border area.

8. The image processing method of claim 7, wherein data values of all pixels in the black border area are all corresponding to the lowest gray scale, and data values of all pixels in the image area are not all corresponding to the lowest gray scale.

9. The image processing method of claim 7, wherein detecting whether the first image has the black border area further comprises:
if the image area has the same size as the first image, by the processing circuit, determining that the first image does not have the black border area.

10. The image processing method of claim 7, wherein removing the black border area of the first image comprises:
by the processing circuit, cutting the first image without breaking the image area, to form the second image.

11. A display device, comprising:
a screen having a display area; and
a processing circuit coupled to the screen and configured to perform operations of:
receiving a first image from one of a plurality of electronic devices;
detecting whether the first image has a black border area; and
if the first image has the black border area, performing a first display operation, wherein performing the first display operation comprises:
removing the black border area of the first image, to generate a second image;
adjusting the size of the second image according to the size of a display area of the screen;
calculating a first blank area of the screen based on the adjusted second image;
requesting a third image from another one of the electronic devices according to the size of the first blank area; and
filling the display area of the screen with the adjusted second image and the third image.

12. The display device of claim 11, wherein the third image has no black borders and has the same size as the first blank area.

13. The display device of claim 11, wherein the processing circuit adjusts the size of the second image proportionally.

14. The display device of claim 11, wherein the operations further comprises:
if the first image does not have the black border area, performing a second display operation, wherein performing the second display operation comprises:
adjusting the size of the first image according to the size of the display area;
calculating a second blank area of the screen based on the adjusted first image;
requesting a fourth image from the another one of the electronic devices according to the size of the second blank area; and
filling the display area of the screen with the adjusted first image and the fourth image.

15. The display device of claim 14, wherein the fourth image has no black borders and has the same size as the second blank area.

16. The display device of claim 14, wherein the processing circuit adjusts the size of the first image proportionally.

17. The display device of claim 11, wherein detecting whether the first image has the black border area comprises:
scanning a plurality of pixels of the first image, to obtain a plurality of data values corresponding to the pixels;
searching an image area according to a distribution of the data values; and
if the image area is different from the first image in size, determining that the first image has the black border area.

18. The display device of claim 17, wherein data values of all pixels in the black border area are all corresponding to the lowest gray scale, and data values of all pixels in the image area are not all corresponding to the lowest gray scale.

19. The display device of claim 17, wherein detecting whether the first image has the black border area further comprises:
if the image area has the same size as the first image, determining that the first image does not have the black border area.

20. The display device of claim 17, wherein removing the black border area of the first image comprises:
cutting the first image without breaking the image area, to form the second image.

* * * * *